US00RE36486E

United States Patent [19]

Hughes

[11] E Patent Number: Re. 36,486

[45] Reissued Date of Patent: Jan. 11, 2000

[54] COMMINUTING APPARATUS

[75] Inventor: John H. Hughes, Montesano, Wash.

[73] Assignee: ComCorp, Inc., Montesano, Wis.

[21] Appl. No.: 08/782,508

[22] Filed: Jan. 10, 1997

Related U.S. Patent Documents

Reissue of:

[64] Patent No.: 5,379,951
Issued: Jan. 10, 1995
Appl. No.: 07/905,148
Filed: Jun. 22, 1992

U.S. Applications:

[ 63] Continuation of application No. 07/634,234, Dec. 26, 1990, abandoned.

[51] Int. Cl.[7] ..... B02C 13/286

[52] U.S. Cl. ..... 241/60; 241/69; 241/101.761; 241/167; 241/186.4; 241/278.1; 241/295

[58] Field of Search ..... 241/191, 192, 241/295, 300, 60, 69, 101.761, 167, 186.4, 278.1, 294, 298, 100, 24.2, 166, 195

[56] References Cited

U.S. PATENT DOCUMENTS

| | | |
|---|---|---|
| 617,523 | 1/1899 | Day . |
| 1,324,389 | 12/1919 | Ekola . |
| 1,736,563 | 11/1929 | Wilmot . |
| 1,903,526 | 4/1933 | Andrews . |
| 2,012,602 | 8/1935 | Forrester . |
| 2,033,123 | 3/1936 | Cowles . |
| 2,045,691 | 6/1936 | Armstrong . |
| 2,620,138 | 12/1952 | Vazieux et al. . |
| 2,796,807 | 6/1957 | Sanford . |
| 2,865,572 | 12/1958 | Lannert . |
| 3,037,540 | 6/1962 | Bloomquist et al. . |
| 3,143,303 | 8/1964 | Palyi . |
| 3,314,617 | 4/1967 | Sargood . |
| 3,319,897 | 5/1967 | Craig et al. . |
| 3,528,617 | 9/1970 | Trevathan . |
| 3,615,059 | 10/1971 | Moeller . |
| 3,713,595 | 1/1973 | Craig et al. . |
| 3,741,104 | 6/1973 | Kannegiesser . |
| 3,823,633 | 7/1974 | Ross . |
| 3,936,005 | 2/1976 | Schnell . |
| 3,955,765 | 5/1976 | Gaitten . |
| 3,964,716 | 6/1976 | McCorkle et al. . |
| 3,979,078 | 9/1976 | Boddeker et al. ..... 241/191 |
| 4,120,460 | 10/1978 | Bacher . |
| 4,243,183 | 1/1981 | Eirich et al. . |
| 4,267,982 | 5/1981 | Hooper . |
| 4,325,516 | 4/1982 | Ismar . |
| 4,366,928 | 1/1983 | Hughes . |
| 4,448,361 | 5/1984 | Marcy . |
| 4,454,995 | 6/1984 | Bloomquist . |
| 4,516,732 | 5/1985 | Kela et al. . |
| 4,583,415 | 4/1986 | Locker . |

(List continued on next page.)

FOREIGN PATENT DOCUMENTS

| | | |
|---|---|---|
| 121751 | 10/1984 | European Pat. Off. . |
| 1151302 | of 0000 | U.S.S.R. . |
| 2122480A | 1/1984 | United Kingdom . |

*Primary Examiner*—Frances Han
*Attorney, Agent, or Firm*—Christensen O'Connor Johnson & Kindness PLLC

[57] ABSTRACT

The comminution of solid materials, such as stumps and wood waste, into particulate form is accomplished by introducing the material to be comminuted into a tub. The tub is rotated to induce a circular motion to the material. Simultaneously, a disk positioned at the bottom of the tub is rotated, preferably in the opposite direction to the tub, in a plane parallel to the tub bottom. The disk has teeth thereon that impact the material in the tub. A screening means at the bottom of the tub is sized to keep the material in the tub until it reaches a desired particle size, at which time the particles can leave the tub through the screening means and enter a collection chamber. The particles are removed from the collection chamber by being entrained in an airstream that passes adjacent an opening in the collection chamber. Preferably, the teeth in the disk are individually replaceable and are symmetric so that once one side is worn the tooth can be reversed in its mount and used again.

36 Claims, 8 Drawing Sheets

U.S. PATENT DOCUMENTS

| | | | |
|---|---|---|---|
| 4,593,861 | 6/1986 | Blakley et al. . | |
| 4,657,192 | 4/1987 | Browning . | |
| 4,664,320 | 5/1987 | Steffens . | |
| 4,699,326 | 10/1987 | Warren . | |
| 4,736,781 | 4/1988 | Morey et al. . | |
| 4,767,069 | 8/1988 | Kim . | |
| 4,773,601 | 9/1988 | Urich et al. . | |
| 4,790,489 | 12/1988 | Paul . | |
| 4,846,411 | 7/1989 | Herron et al. . | |
| 4,848,682 | 7/1989 | Scheler | 241/191 X |
| 4,934,615 | 6/1990 | Osborne . | |
| 4,997,135 | 3/1991 | Zehr . | |
| 5,005,772 | 4/1991 | Ostergaard | 241/192 X |
| 5,058,815 | 10/1991 | Pozzato et al. | 241/192 |
| 5,320,292 | 6/1994 | Smith | 241/191 X |

COMMINUTING APPARATUS

Matter enclosed in heavy brackets [ ] appears in the original patent but forms no part of this reissue specification; matter printed in italics indicates the additions made by reissue.

This application is a continuation application based on prior copending application Ser. No. 07/634,234, filed on Dec. 26, 1990 now abandoned.

BACKGROUND OF THE INVENTION

This invention relates to comminuters for reducing solid material such as stumps and wood scraps to a particulate form. More particularly, this invention relates to a comminuting method in which the material to be comminuted is rotated about the interior of a tub and impacted by a counterrotating toothed disk. A comminuter to carry out the method includes a toothed disk rotatably mounted at the bottom of a tub or pan that is counterrotated to enhance the comminuting action. Preferably, the comminuter is mounted on a wheeled frame that permits its easy movement from location to location.

Comminuters comprising a series of rotatable upright comminuting rolls positioned to define a comminuting chamber into which the material to be comminuted is fed, and containing a screening means to control the size of particulate matter exiting the comminuter, are well known. Such comminuters have typically been large-scale machines requiring a relatively large power source to rotate the comminuter rolls, or to rotate a paddle impeller, to maintain orbital movement of the material being comminuted within the comminuting chamber to maximize contacts between the comminuting rolls and the material being comminuted.

It is an object of the present invention to provide a comminuter that requires a relatively smaller engine to provide rotational force and to eliminate the need for an impeller, thereby reducing the overall power needs of the comminuter.

It is also an object of the present invention to provide a simpler and more cost-effective comminuter.

SUMMARY OF THE INVENTION

The invention herein provides a method of comminuting that requires the introduction of the material to be comminuted into a tub or pan. The tub is rotated to impart a rotational motion to the material. The material is impacted by the teeth of a counterrotating disc. The resulting particles are screened and those below a predetermined size are allowed to exit the tub. A comminuter for carrying out the method and reducing solid material to particulate form includes a base and a tub rotatably mounted on the base. A first drive means is mounted on the base and associated with the tub for rotating the tub in a first direction. The tub includes a bottom wall and a disk is mounted on the base, but within the tub, for rotation in a plane parallel to the plane of the bottom wall of the tub. The diameter of the disk is smaller than the diameter of the tub and the axis of rotation of the disk is offset from the axis of rotation of the tub. A second drive means is mounted on the base and is drivingly associated with the disk for rotating the disk in a second direction, preferably opposite the tub rotation. A plurality of tooth members are mounted on the disk projecting from the disk into the tub to contact the material to be comminuted. A screening means is mounted in the bottom of the tub for allowing the exit of material of a predetermined size from the tub. In its preferred embodiment, the base of the comminuter is mounted on wheels to provide portability to the comminuter.

BRIEF DESCRIPTION OF THE DRAWINGS

The objects and advantages of the present invention will be better understood by those of ordinary skill in the art and others, upon reading the ensuing specification, when taken in conjunction with the appended drawings, wherein.

DETAILED DESCRIPTION OF THE PREFERRED EMBODIMENT

Figure 1:
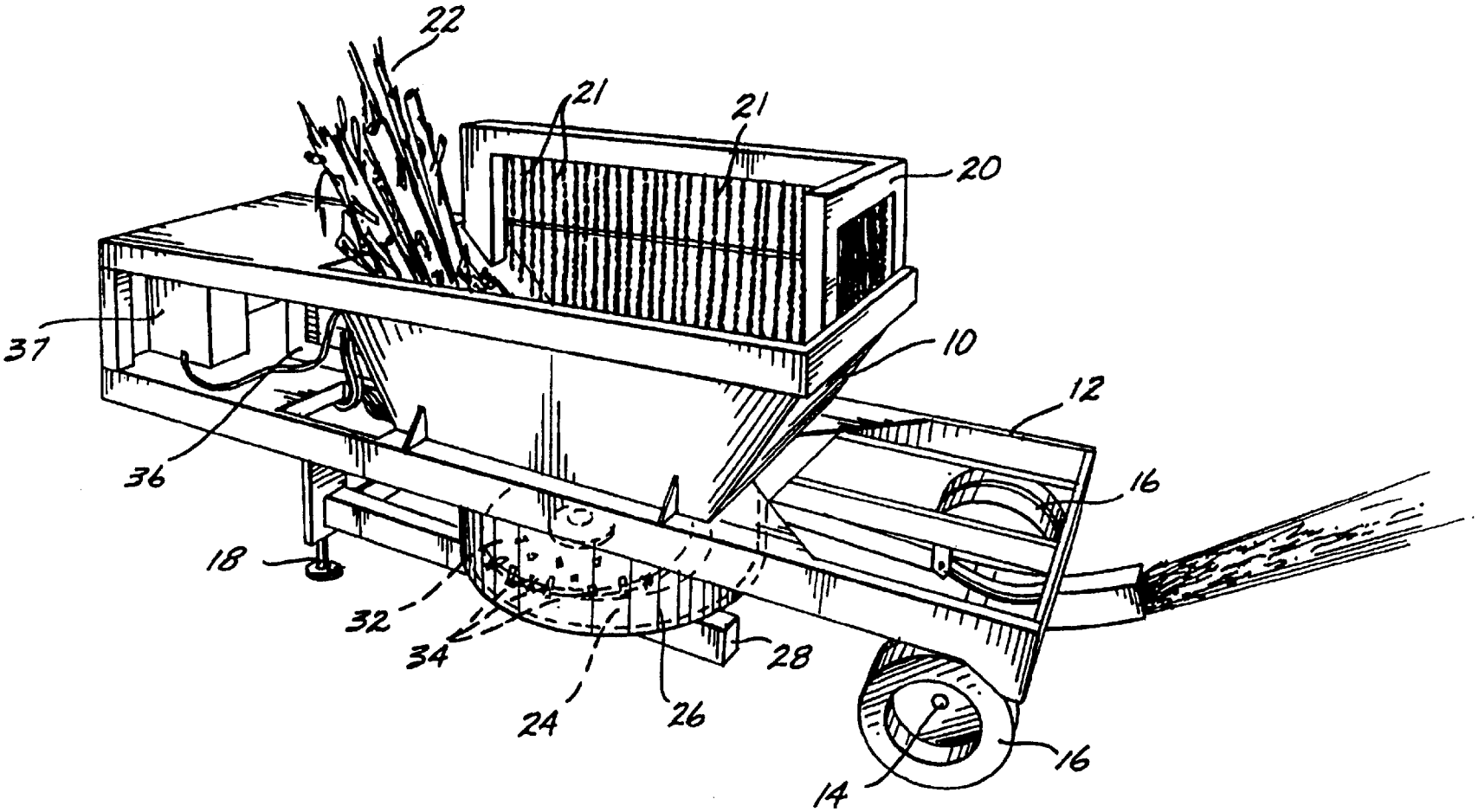
FIG. 1 is an isometric view of one embodiment of the comminuter of the present invention mounted on a wheeled trailer.
Figure 2:
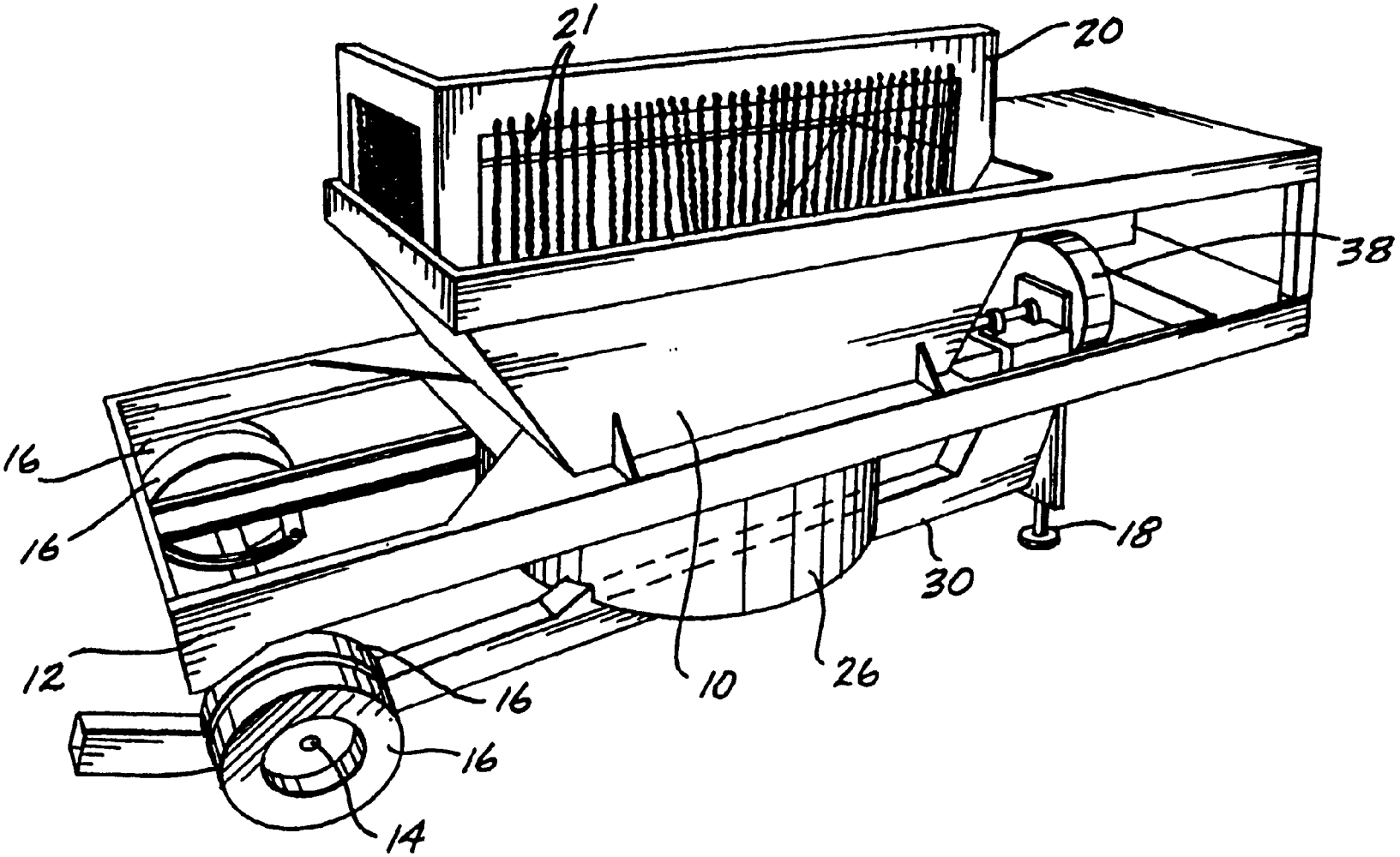
FIG. 2 is an isometric view of the comminuter of FIG. 1 from a different viewing angle.

FIGS. 1 and 2 show a preferred embodiment of a comminuter made in accordance with the principles of the present invention. The comminuter includes a hopper 10 that is mounted atop a rectangular frame 12. Preferably, the frame 12 is constructed as a trailer suitable for hauling behind a tractor assembly (not shown) for movement of the comminuter from [Job] *job* site to job site. As such, the frame 12 has mounted on it an axle 14 that has suitable wheels 16 mounted thereon. The frame 12 also has a pair of adjustable [Jack] *jack* legs 18, of the type typically associated with truck trailer assemblies, mounted at its front end to allow the trailer to stand when disconnected from a tractor assembly. A curtain assembly is mounted atop the hopper 10 and consists of the curtain frame 20, and a of lengths of chain 21 hanging vertically from the curtain frame 20 to form a curtain that diminishes the amount of material that can be thrown up out of the hopper and over the edge of the hopper onto the ground.

As can be seen, the material to be comminuted consists of various wood scraps or stumps 22 that are fed into the hopper using a loader (not shown). The material 22 moves down through the hopper into a tub 24 mounted on the frame below the hopper 10. The tub is of cylindrical shape and is shown in dotted line in FIG. 1. The tub is surrounded by a cylindrical housing 26 that is supported by the frame members 28 and 30. Also shown in phantom line in FIG. 1 is a rotatable disk 32, which rotates within the tub. The disk has a series of teeth 34 mounted at various locations on the disk and projecting outwardly from the disk into the tub to contact the material 22 to be comminuted. The disk 32 is driven by a belt drive that is powered by a diesel engine 36 also mounted on the trailer 12. The diesel engine also runs a hydraulic pump 37 that provides hydraulic pressure to operate other portions of the comminuter, as will be described below. In addition, the diesel engine runs a blower 38 that is used to provide an airflow though the beam 30, which is hollow and which is better seen in FIG. 3.

Figure 3:
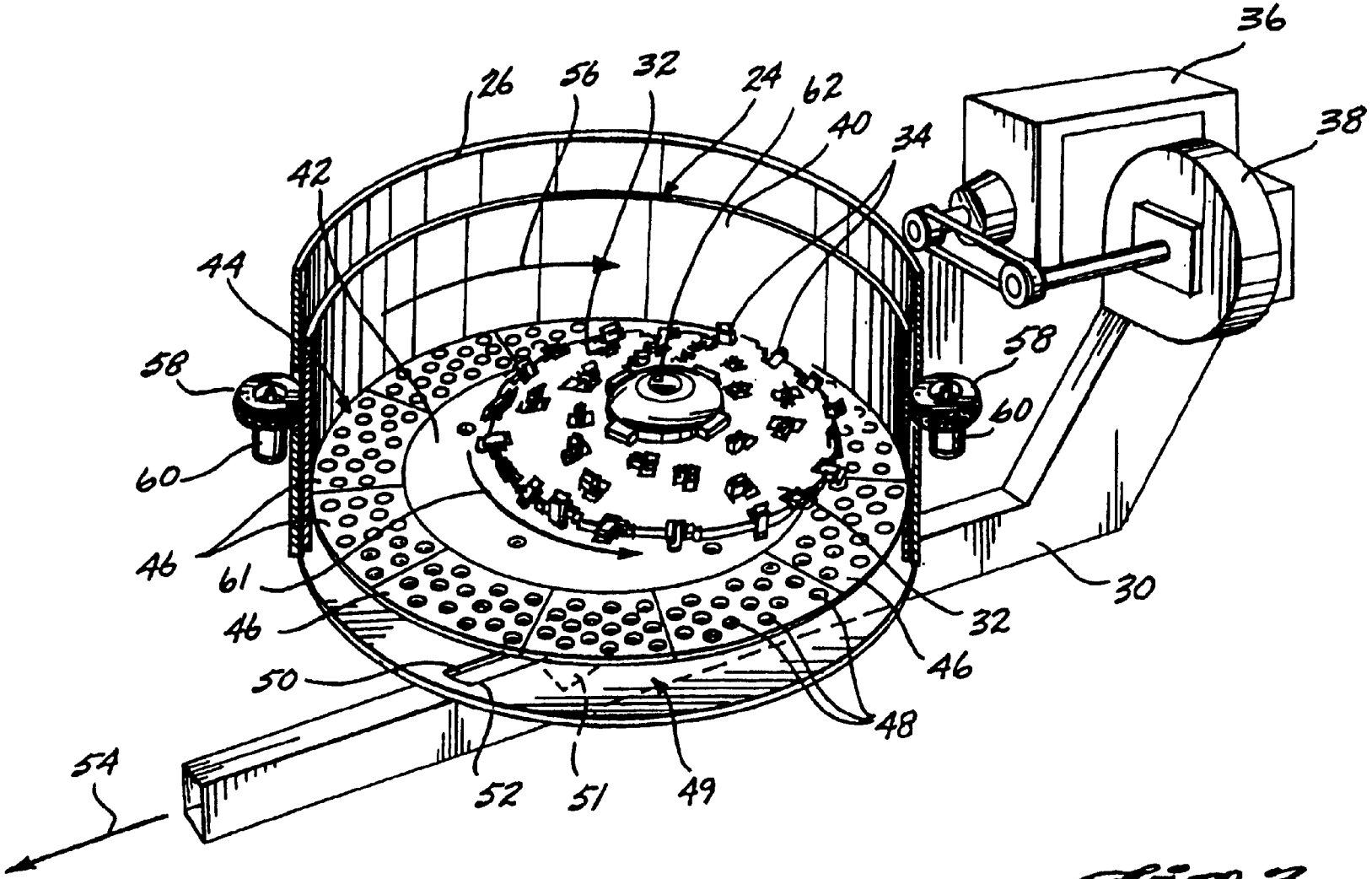
FIG. 3 is an isometric view of the portion of the comminuter of FIG. 1 showing the comminuting chamber and the toothed disk rotating therein.

FIG. 3 shows in greater detail the operation of the comminuter of the present invention. The outer cylindrical housing 26 is stationary relative to the trailer 10 while the tub 24 rotates within the cylindrical housing 26. The tub 24 includes a vertically arranged sidewall 40 that rotates within the housing 26. The tub 24 also includes a bottom wall comprised of a stationary circular portion 42 and an annular portion 44 that surrounds the stationary portion 42. The annular portion 44 is adjacent and perpendicular to the sidewall 40 and rotates with it. The annular portion 44 is comprised of a series of grate segments 46 that lie on an underlying framework. The grate segments 46 provide a screening function and have a plurality of holes 48 formed in them. The size of the holes 48 formed in the grate segments 46 determines the particle size that will exit the tub 24. If it is desired to change the size of the particles being produced, the grate segments 46 can be removed and replaced with other grate segments having holes of a different size formed therein. The grate segments 46 are spaced above the bottom of the cylindrical housing 26 to form a collection chamber 49 below the tub 24. An opening 50 is formed in the bottom of the cylindrical housing 26 and a corresponding opening 52 is formed in the top of the tube 30. The air passing from the blower 38 through the tube 30 causes an entrainment of the particles within the collection chamber into the airstream passing through the tube 30 so that they exit the end of the tube as shown by the arrow 54. Preferably, there is a constriction in the tube 30 to form a venturi to increase the velocity of the air passing through the tube at the position of the openings 50 and 52 to enhance the entrainment effect and thereby carry the particles away from the tub at a faster rate. In the illustrated embodiment a plate 51 is mounted within the tube 30 just upstream of the opening 52 to form the venturi restriction.

In the illustrated embodiment, the tub 24 is rotated in a clockwise direction, as shown by arrow 56, by the rotation of pneumatic tires 58 mounted on wheels that, in turn, are driven by hydraulic motors 60. As discussed earlier, the diesel engine 36 runs a hydraulic pump 37, which, in turn, provides high-pressure hydraulic fluid to the hydraulic motors 60. The hydraulic motors then drive the tires 58, which are in contact with the outer surface of the tub 24, to rotate the tub. Although only two such tires are shown in FIG. 3, in fact, in the preferred embodiment, there are four tires spaced equidistant around the tub. The tub itself is mounted on a bearing that allows some lateral movement and the four tires 58 provide a centering force that keeps the tub rotating in an essentially noneccentric path but the tires have sufficient give so that, if a large piece of wood, such as a stump, or a piece of metal becomes lodged in the tub, there is some play for the tub to move with relation to the disk 32 so that the [Jam] *jam* may free itself so that any serious damage to the comminuter caused by such a jam is prevented. Also, the tire can be inflated to a predetermined pressure so that they act as a clutch in the event of a [Jam] *jam*. If the tub is solidly jammed, the tires will slip on the sidewall 40, rather than trying to force the tub to the breaking point of some of the structural pieces. As can be seen in FIG. 3, the disk 32 is rotatably mounted on an axis offset from the central axis as of the tub 24. In the illustrated embodiment, the disk 32 is smaller in diameter than the tub 24 and, in fact, may be smaller in diameter than the inner diameter of the annular screening ring 44. In the illustrated embodiment, the disk 32 is rotated in a counterclockwise direction as shown by arrow 61. A quick-change hub 62 is provided to hold the disk on the shaft so that it can be easily removed in case it is necessary to replace or repair the disk.

The disk 32 contains a plurality of teeth 34 projecting therefrom and the comminuting action is carried out by the impact of the material in the tub against the teeth 34. The comminuting action is enhanced by the motion of the material being tumbled as a result of the rotating motion of the tub. The teeth 34 on the rotating disk 32 rip and tear the material into smaller pieces. As the disk and tub rotate, the material continues to be impacted by the toothed disk and continues to be shredded and formed into particles of a size small enough to fit through the holes 48 in the grate segments 46, enter the collection chamber 49 below the bottom of the tub 24 for eventual entrainment in the airstream within tube 30, and exit from the comminuter. The teeth and the means for mounting them on the disk 32 will be discussed in greater detail below. However, it should be noted that, in the preferred embodiment, the teeth that extend downwardly from the disk at its edges are set so that they just barely scrape the top surface of the bottom wall of the tub 24. This scraping action provides for further comminution and the cleaning of the bottom of the comminuter and the holes in the grate segments 46 to keep the holes free of material.

Figure 4:
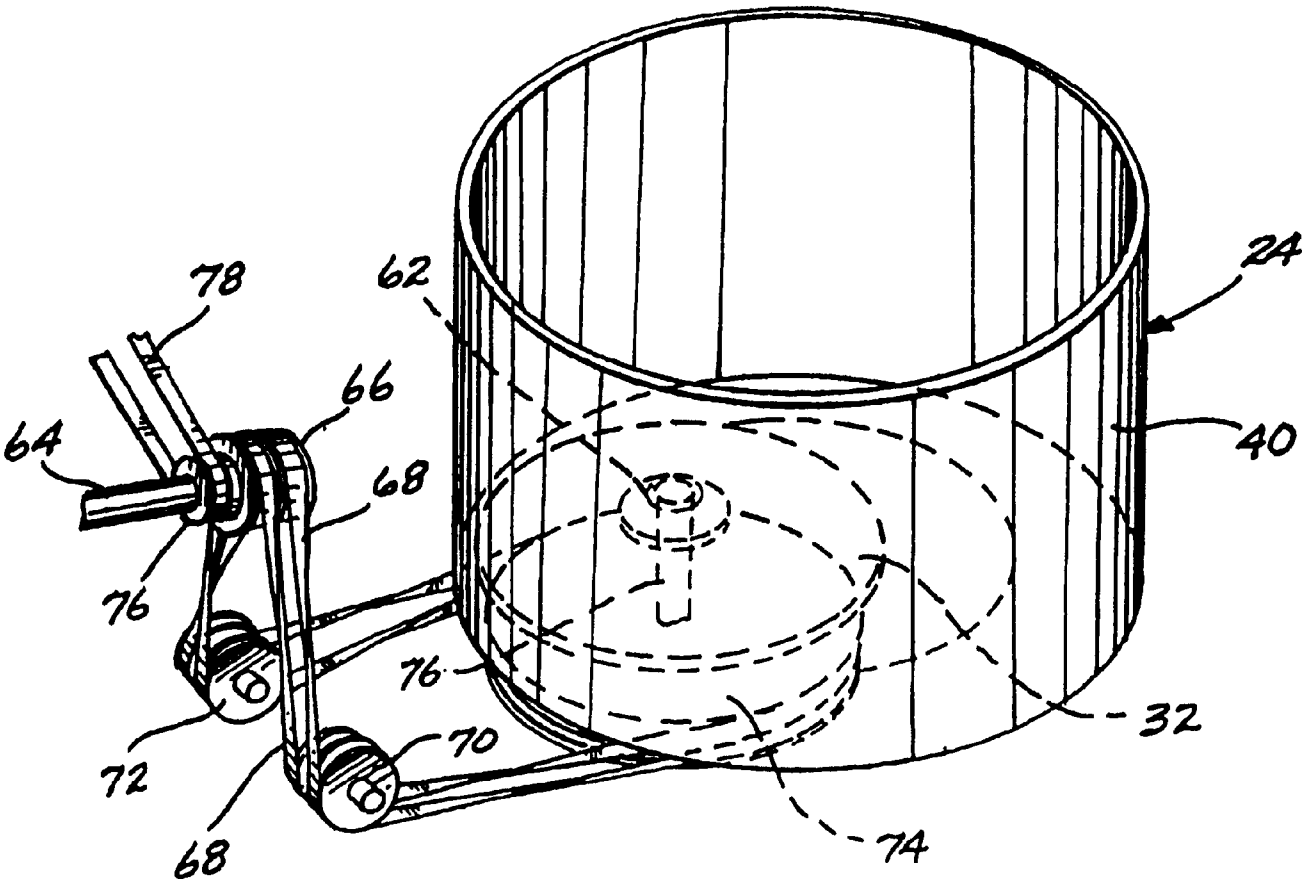
FIG. 4 is a somewhat schematic view of a portion of the comminuter of FIG. 1 showing the drive system for the comminuting disk.

In FIG. 4, in a somewhat schematic fashion, it can be seen that the disk 32 is driven by a belt drive system powered by the diesel engine 36. The diesel engine 36 drives a shaft 64 that, in turn, drives a pulley 66 that has the drive belts 68 mounted thereon. From the pulley 66 the drive belts run to a pair of quarter-turn pulleys 70 and 72, which change the orientation of the belts and allow them to wrap in a horizontal orientation about a hub 74 that is driveably connected to a shaft 76 upon which the disk 32 is mounted. The shaft 76 comes up through a hole formed in the bottom of the tub 24 and the quick-change hub 62 is mounted on top of the shaft 76 to hold the disk 32 in place on the shaft. It should be understood, by those of ordinary skill in the art and others, that other drive means can be utilized to rotate the disk 32. However, this means has been found to be satisfactory, particularly since the drive shaft 64 can also provide power to a pulley 76 mounted on the shaft to drive a belt 78 mounted on the pulley 76. The belt 78 drives the blower 38, which provides air for the transport of particles from the comminuter. As mentioned earlier, the diesel 36 also rims the hydraulic pump 37 that provides hydraulic power to the hydraulic motor 60 for purposes of turning the tub 24. Therefore, it can be seen that the single diesel engine 36 provides power to the entire comminuter for turning the tub, the disk, and providing power for the particle removal system, without the need for further power plants.

Figure 5:
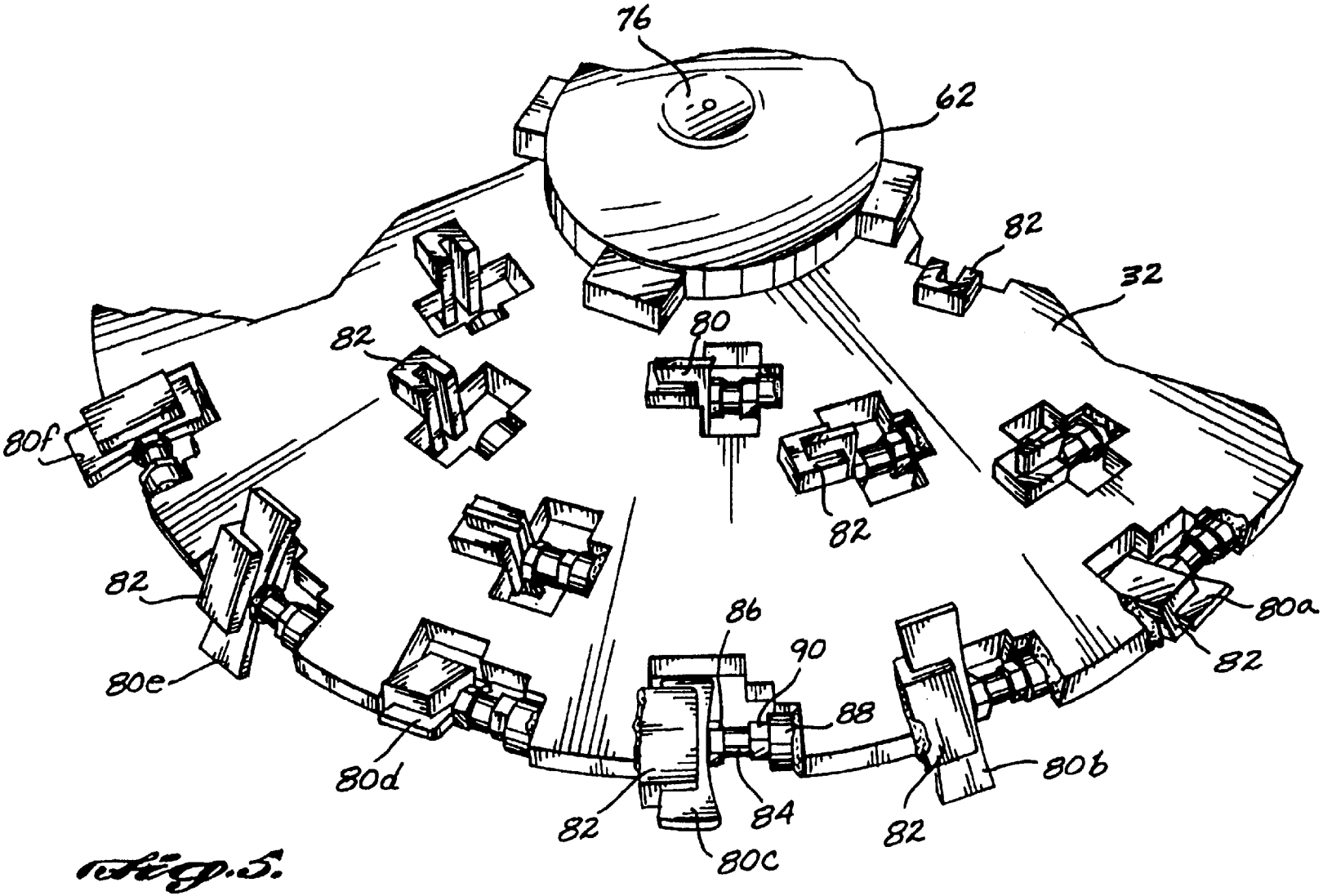
FIG. 5 is an isometric view of a portion of the comminuting disk showing the arrangement of the teeth thereon.

Referring now to FIG. 5, the disk 32 is shown in greater detail. The disk 32 has a plurality of openings formed in it to accept comminuting teeth. In the preferred embodiment the teeth 80 are bow-tie shaped pieces, cut from steel plate, and mounted in a rectangular holder 82 that is welded into place on the disk 32 adjacent each of the holes. The holders 82 are mounted in various angles with relation to the surface of the disk to provide the teeth mounted in them with a variety of attack angles at which they will strike material within the comminuter. In the embodiment shown in FIG. 5, for example, looking at the teeth mounted on the outer rim of the disk 32, the first tooth 80a has its first end raised above the horizontal plane and the tooth is at approximately a 60-degree angle, whereas the second tooth 80b is at an angle of approximately 60 degrees blow the horizontal plane. The third tooth 80c lies approximately in the horizontal plane. The pattern is repeated for the following teeth 80d, 80e, 80f, and so on. Similarly, the teeth placed on the interior surfaces of the disk are also angled variously to provide a greater variety of contact angles with the comminuted materials. As discussed earlier, the lowermost edges of the teeth 80 are positioned to just barely come into contact with the upper surface of the bottom wall of the tub 24. In other words, the teeth 80 scrape the bottom wall of the tub 24 and the grate segments 46 to keep the holes in the grate segments 46 open.

The teeth 80 are held in place by an interference fit within the holder 82 and also are maintained by a bolt 84 that has a head 86 that contacts one edge of the tooth 80 and a shaft that fits into a collar 88, which is welded onto the disk opposite the tooth holder 82. A lock nut 90 threadably engages the bolt 84 and is threaded on the bolt shaft to tighten the head 86 against the tooth 80 to in holding the tooth in place.

Figure 6:
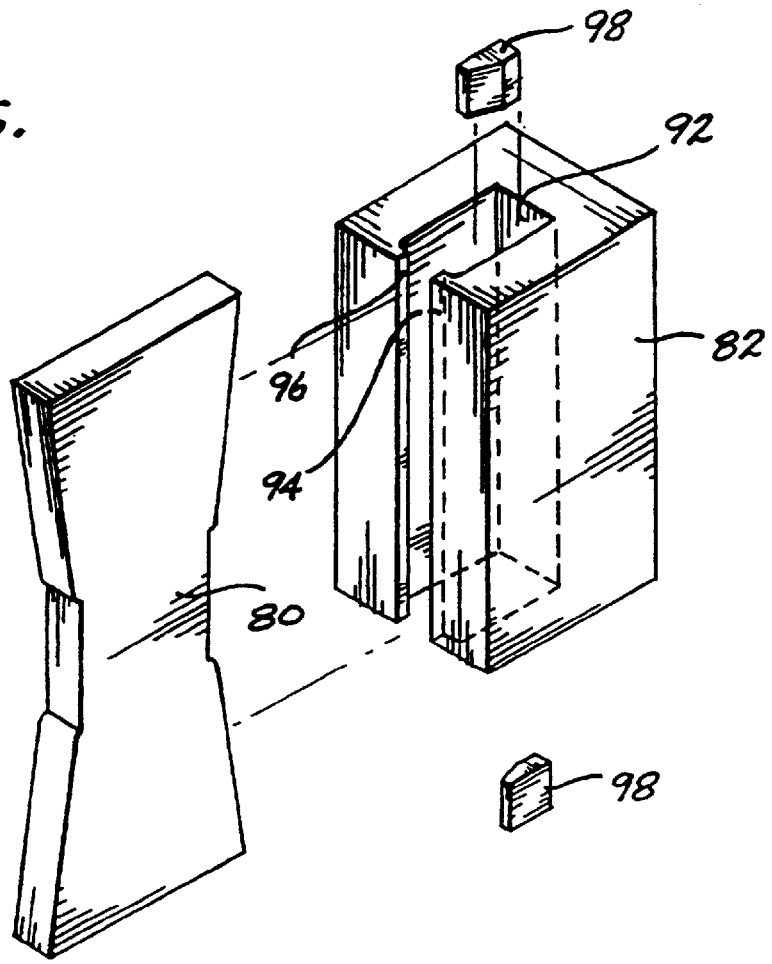
FIG. 6 is an exploded isometric view of a preferred embodiment of a tooth for use in the comminuter of the present invention along with the tooth-mounting means shown in FIG. 5.
Figure 7:
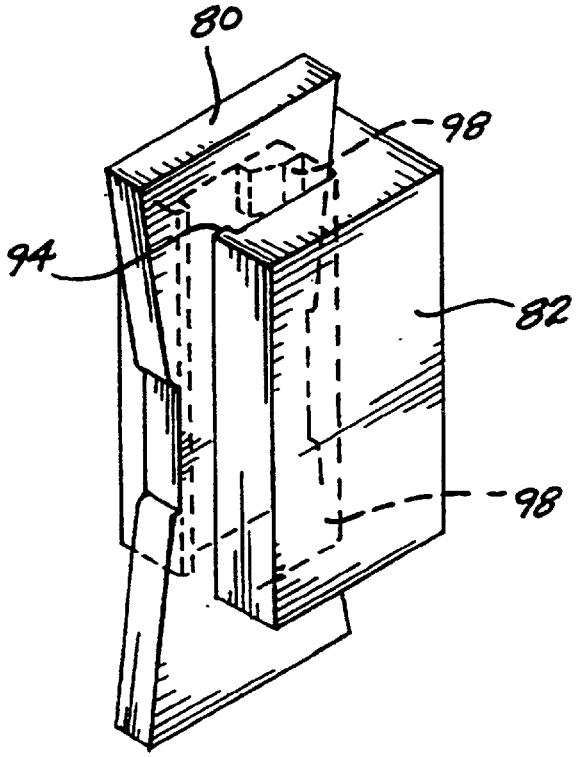
FIG. 7 is an isometric view of the assembled tooth and mounting means shown in FIG. 6.
Figure 8:
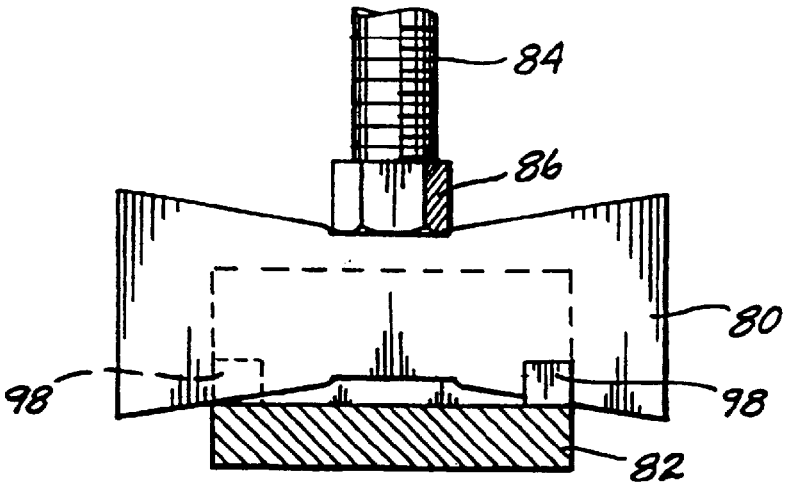
FIG. 8 is a side elevation view of the tooth assembly of FIGS. 6 and 7 showing its mounting on the disk.
Figure 9:
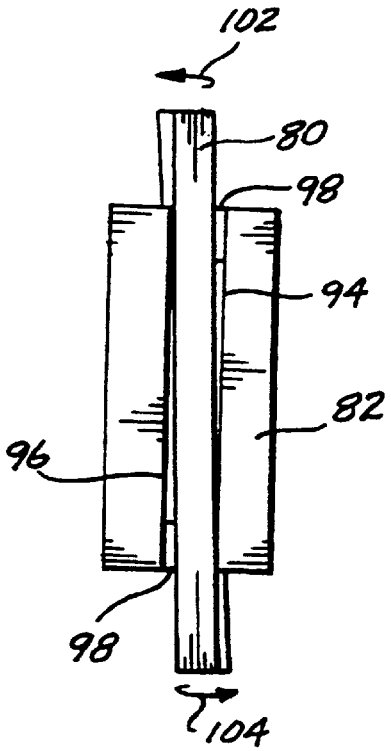
FIG. 9 is a front elevational view of the tooth assembly of FIG. 7.

The construction of the tooth and its relationship to the holder 82 are shown in more detail in FIGS. 6, 7, 8, and 9. FIG. 6 shows the tooth bolder 82 as flame cut from a piece of rectangular stock. The tooth holder 82 has a rectangular aperture 92 formed through the long dimension of the holder 82. A slot is cut in one face of the holder 82, slightly narrower than the rectangular aperture 92, providing ledges 94 and 96 along the slot. Wedge pieces 98, of identical shape, are welded into the holder 82 within the aperture 92 on opposite sides of the aperture. FIG. 7 shows the wedges 98 in their mounted position. After the wedges 98 are welded in place, the tooth member 80 is drive into the slot and the rectangular aperture 92 until one edge of the tooth 80, shown as the right edge in FIGS. 6 and 7, rests against the bottom of aperture 92. As can be seen in FIG. 8, which is a side view of the tooth assembly, the bottom edge of the tooth 80 is resting on the block 82 and the bolthead 86 makes a third contact with the tooth providing a three-point mounting system that provides great stability for the tooth when it is in place on the disk. In addition, the placement of the wedges 98 imparts a slight twist, which is shown in somewhat exaggerated fashion in FIG. 9, as indicated by arrows 102 and 104, to pin the tooth against the opposing edges of the ledges 94 and 96. In this manner, the tooth 80 is tightly wedged into the tooth holder 82, and resists loosening due to the impact of the tooth with the material begin comminuted. Preferably, as shown in FIGS. 6 and 7, the side edges of the tooth 80 have a flat spot formed therein to accept the head 86 of the mounting [belt] *bolt*, and provide good contact between the bolthead and the edge of the tooth. Also, preferably, the tooth 80 is symmetrical so that, when the tooth becomes worn on one edge from contact with material being comminuted, it can be turned over and the second edge exposed to the material being comminuted, thereby giving a much longer life to each individual tooth member.

Figure 10:
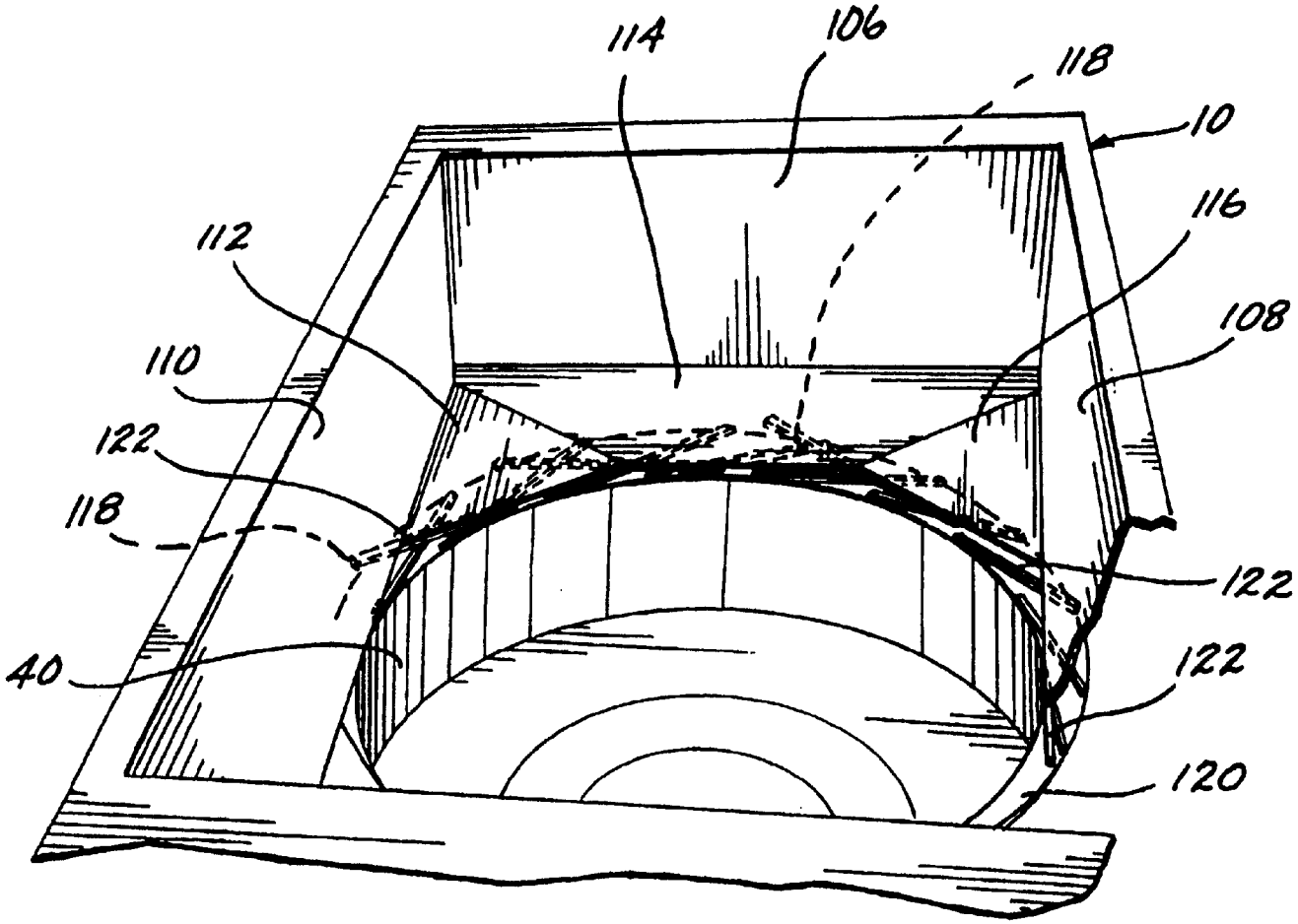
FIG. 10 is an isometric view of a portion of the comminuter of FIG. 1 showing the interface between the input hopper and the comminuting chamber.

As is apparent from FIGS. 1 and 2, the hopper 10 has planar sidewalls that slope downwardly and inwardly to form the hopper 10. The tub 24, on the other hand, is a cylindrical shape and it is therefore necessary to mate this square-sided hopper with a rounded-side tub. A sealing means has been formed at the interface between the hopper and the tub to prevent excess spillage of material out of the tub, through the space between the bottom of the hopper and the top of the tub, while maintaining the ability to rotate the tub relative to the hopper. This sealing means is illustrated in FIG. 10, which is a view of the comminuter looking down into the hopper 10. The hopper 10 includes sidewalls 106, 108, and 110, which are shown in FIG. 10, and a fourth sidewall that is not visible in FIG. 10. The bottom of the hopper 10 is comprised of angled walls 112, 114, and 116 to represent one side of the hopper; a similar configuration is present on the other side of the hopper, which is not viable in FIG. 10. A series of bars 118 is welded to the bottom of the hopper and each bar is essentially an extension of the edge of its respective wall 112, 114, and 116, as shown in FIG. 10. The bars 118 are relatively small compared to the hopper but do extend below the bottom edge of the hopper. Coincidentally, the top of the tub 24 includes a lip 12 that extends inwardly from the vertical wall 40 of the tub below the interface with the hopper 10. The top of the lip 120 has a series of ridges 122 formed thereon, which extend above the lip 120 and are in close proximity to but do not touch the bottom most portions of the bars 118.

The ridges 122 radiate approximately tangentially from the inner top edge of the lip 120 to the outer edge of the lip 120. The ridges 122 and bars 118 are arranged so that, in the preferred mode of operation wherein the tub 24 rotates in a clockwise direction, the ridges 122 and bars 118 are sweeping against one another to form a continuous seal of the space between the hopper and the tub. It should be understood that the term "seal" in the context of the present invention does not mean an airtight or watertight fit but only that large particles are prevented from passing through the space. Certainly, some dust and small particles will escape through this coarse sealing arrangement.

In a preferred embodiment, the drive means that drive the tub and the disk have a transmission attached that allows the direction of rotation of the tub or the disk or both to be reversed. In the event of a jam it is desirable to be able to reverse the direction of rotation of the disk or tub to clear the jam. The hydraulic motors 60 used to drive the tires 58 that turn the tub 24 can be operated in either direction and a valving change to alter the direction of flow of hydraulic fluid to the motors is all that is needed to reverse motor direction. The rotation of the disk is mechanically driven and it is necessary to include a mechanical transmission to reverse the belt drive to cause a reversal of the direction of rotation of the disk. Referring again to the drive means for the tub, the hydraulic system that delivers fluid to the motors 60 includes a valve system that applies a predetermined fluid pressure to the motors but will vent pressure if the tub jams. The venting of pressure prevents breakage of mechanical parts since it will not attempt to force the tub to turn if the resistance is too great. Conditions leading to a tub jam include an overfull tub or a piece of scrap metal that becomes jammed in the tub.

The comminuter disclosed herein uses a rotating tub to move the material to be comminuted in an orbital manner. A disk having several teeth projecting from it in various locations and orientations is rotated parallel to the bottom of the tub so that the teeth on the disk impact the material being comminuted. Preferably, the disk is rotated in the opposite direction to the tub rotation. A screening means keeps the particles of material in the tub until they reach a small enough size to drop into a collection chamber below the tub and are removed to a remote location. While a preferred embodiment of such a comminuter has been described herein, it should be understood that the illustrated and described embodiment is exemplary only and that changes can be made to that embodiment, while remaining within the scope of the present invention.

For example, a screening means constructed of a series of crossed reinforcing rods could replace the apertured segments pictured herein. Also, other drive systems could replace those described above. While an air entrainment system is used to move the particles from the collection chamber, it would be possible to use a conventional conveyor to accomplish that task. The precise configuration of the teeth and the tooth-mounting means described herein could also be changed. Because of the changes that could occur without exceeding the scope of the invention, the invention should be defined solely with reference to the claims that follow.

The embodiments of the invention in which an exclusive property or privilege is claimed are defined as follows:

1. A comminuter for reducing solid material to particulate form comprising:

a frame;

a tub rotatably mounted on said frame, said tub including a cylindrical sidewall and a bottom wall consisting of an annular portion affixed to said sidewall and perpendicular thereto, said a central, circular portion mounted on said frame and separated from said annular portion but lying in the same plane as the annular portion;

a first drive means mounted on said frame and drivingly connected to said sidewall and said annular port for rotating a sidewall and said annular portion in a first direction;

a disk mounted within said tub, in a plane parallel to and spaced above the plane of said annular portion and said circular portion;

a drive motor mounted on said frame and drivingly coupled to said disk to rotate said disk in a second direction; and a plurality of tooth members mounted on said disk and projecting from said disk into said tub, the orientation of each tooth member being individually adjustable independent of the orientation of each other tooth member.

2. The comminuter of claim 1, further including transmission means associated with said first dive means for reversing the direction of rotation of said tub.

3. The comminuter of claim 1, further including transmission means associated with said drive motor and operable to reverse the direction of rotation of said disk.

4. The comminuter of claim 1, wherein said second direction is opposite said first direction.

5. The comminuter of claim 1, wherein the axis of rotation of said disk is offset from the axis of rotation of said tub.

6. The comminuter of claim 1, wherein said frame is mounted on wheels to provide portability of said comminuter.

7. The comminuter of claim 1, further including tooth-mounting means associated with each of said teeth in said disk for mounting said teeth at varying angles of projection from said disk, at least some of said teeth pointing downwardly toward the bottom of said tub, said downwardly pointing teeth scraping the bottom wall of said tub.

8. The comminuter of claim 7, wherein said tooth-mounting means includes a mounting beam having a slot formed therein, said tooth being substantially planar and resting in said slot, a first and second bias wedge mounted in said slot on opposite sides of said planar tooth, said bias wedges of a size such that they exert a twisting force on said tooth to deform said tooth and provide an interference fit of said tooth in said slot.

9. The comminuter of claim 8, wherein each of said teeth is symmetrical with first and second material-contacting edges, respectively, located on each end thereof, said mounting means holding said teeth so that only said first material-contacting edge is exposed and said second material-contacting edge is protected such that, when said first material-contacting edge is worn, said tooth can be rotated 180 degrees and its second material contacting edge exposed.

10. The comminuter of claim 1, wherein said first drive means includes at least three radially flexible wheels mounted exteriorly to said sidewall and spaced about said sidewall and in contact with the exterior of said sidewall to provide a centering force on said tub as it is driven by said radially flexible wheels, said radially flexible wheels constructed to permit some lateral movement of said tub so as to absorb the shock caused by the entry of heavy objects into said tub.

11. The comminuter of claim 10, wherein said radially flexible wheels act as a clutch means to provide a predetermined clutch force that permits said drive means to drive said sidewall, but is limited so that said drive means slips if said sidewall becomes jammed and unable to rotate.

12. The comminuter of claim 11, wherein said radially flexible wheels comprise pneumatic tires mounted on rims and inflated to a predetermined pressure to come in contact with said sidewall with said clutch force.

13. The comminuter of claim 1, further including screening means mounted in said annular portion of said bottom wall of said tub for allowing the exit of material of a predetermined size from said tub, said screening means comprised of a plurality of segments cooperatively mounted on said tub to form said annular portion of said bottom wall.

14. The comminuter of claim 13, including discharge means in communication with said screening means for moving said particles of material from said tub.

15. The comminuter of claim 13, further including a collection chamber located below said bottom wall of said tub in communication with said screening means to receive the particles from said tub that pass through said screening means.

16. The comminuter of claim 15, wherein said collection chamber has an opening for removal of said particles.

17. The comminuter of claim 16, further including a tube positioned exteriorly to said tub, said tube having a port formed in a sidewall thereof in register with the opening in the collection chamber and further including a blower connected to one end of said tube to provide a flow of air through said tube.

18. The comminuter of claim 17, wherein said tube has a constriction therein adjacent said port.

*19. A comminuter for reducing solid material to particulate form comprising:*

*a frame;*

*a tub including a cylindrical sidewall and a bottom disposed across an end of said sidewall, said sidewall being rotatably mounted on said frame;*

*a first drive means mounted on said frame and drivingly connected to said sidewall for rotating said sidewall in a first direction;*

*a disk rotatably mounted within said tub adjacent said bottom of said tub;*

*a drive motor mounted on said frame and drivingly coupled to said disk to rotate said disk in a second direction; and*

*a plurality of teeth mounted on said disk and protecting from said disk into said tub, the orientation of each tooth being individually adjustable independent of the orientation of each other tooth.*

*20. The comminuter of claim 19, wherein said second direction is opposite said first direction.*

*21. The comminuter of claim 19, wherein the axis of rotation of said disk is offset from the axis of rotation of said sidewall.*

*22. A comminuter tooth for use in a comminuter for reducing solid material to particular form, the comminuter including a mounting block assembly defining a tooth receiving slot, the slot defining first and second bearing surfaces, the tooth comprising:*

*plate member including a cutting edge and first and second sides, said plate member being sized for mounting in the slot in the comminuter mounting block assembly such that the plate member can be driven into the slot with the first and second sides of the plate member bearing on the first and second bearing surfaces of the slot, the first and second bearing surfaces of the slot having a contour that induces a twist in the plate member and securely retains the plate member within the slot.*

*23. The comminuter tooth of claim 22, further comprising a contact surface for positively ending an opposing surface external to said tooth to further maintain said plate member in the slot.*

*24. The comminuter tooth of claim 22, wherein the plate member is contoured to bear against and be twisted by a bias wedge assembled within the slot of the comminuter mounting block assembly.*

*25. A comminuter tooth and mounting block combination for use in a comminuter for reducing solid material to particulate form, the combination comprising:*

*a tooth plate member;*

*a mounting block having a slot formed therein, said slot sized for receiving said tooth plate member; and*

*a first bias wedge assembled within said slot;*

*wherein said tooth plate member may be inserted into said slot with the tooth plate member contacting said assembled bias wedge to induce a twisting force on said tooth plate member to deform said tooth plate member, wherein an interference fit of said tooth plate member in said slot is achieved.*

*26. The comminuter tooth and mounting block combination of claim 25, wherein the mounting block defines first and second bearing surfaces for opposing the forces imparted by the tooth resulting form being twisted, thereby providing the interference fit of said tooth in said slot.*

*27. The comminuter tooth and mounting block of claim 25, further comprising a second bias wedge assembled within said slot to oppose said first bias wedge.*

*28. The comminuter tooth and mounting block combination of claim 25, wherein the tooth defines a contact surface for positively engaging an opposing surface external to the tooth.*

*29. The comminuter tooth and mounting block combination of claim 25, wherein said first bias wedge is integrally secured to the mounting block.*

*30. A comminuter for reducing solid material to particulate form comprising:*

*a frame;*

*a tub including a cylindrical sidewall and a bottom disposed across an end of said sidewall, said sidewall being rotatably mounted on said frame;*

*a motor mounted on said frame and driving connected to said sidewall for rotating said sidewall in a first direction;*

*a disk rotatably mounted within said tub with a plane of rotation adjacent said bottom of said tub;*

*a drive motor mounted on said frame and drivingly coupled to said disk to rotate said disk in a second direction; and*

*a plurality of teeth mounted on said disk and projecting from said disk into said tub.*

*31. The comminuter of claim 30, further comprising transmission means associated with said motor for reversing the direction of rotation of said tub.*

*32. The comminuter of claim 30, wherein said second direction is opposite said first direction.*

*33. The comminuter of claim 30, wherein the axis of rotation of said disk is offset from the axis of rotation of said sidewall.*

*34. The comminuter of claim 30, wherein the plurality of teeth are replaceable part from said disk.*

*35. A comminuter for reducing solid material to particulate form comprising:*

*a frame;*

*a tub including a cylindrical sidewall and a bottom disposed across an end of said sidewall, said sidewall being rotatably mounted on said frame;*

*a motor mounted on said frame and drivingly connected to said sidewall for rotating said sidewall in a first direction;*

*a disk rotatably mounted within said tub with a plane of rotation adjacent said bottom of said tub;*

*a drive motor mounted on said frame and drivingly coupled to said disk to rotate said disk in a second direction; and*

*a plurality of teeth mounted on said disk and projecting from said disk at a plurality of dispositions into said tub.*

*36. The comminuter of claim 35, wherein said plurality of teeth projecting from said disk at said plurality of dispositions is comprised of a plurality of teeth projecting from said disk at various angles with relation to a surface of the disk.*

* * * * *

UNITED STATES PATENT AND TRADEMARK OFFICE

CERTIFICATE OF CORRECTION

PATENT NO. : Re. 36,486
DATED : January 11, 2000
INVENTOR(S) : J.H. Hughes

It is certified that error appears in the above-identified patent and that said Letters Patent is hereby corrected as shown below:

| COLUMN | LINE | |
|---|---|---|
| 7 (Claim 1, | 23 line 11) | "port" should read --portion-- |
| 7 (Claim 1, | 24 line 12) | "rotating a" should read --rotating said-- |
| 7 (Claim 2, | 39 line 2) | "dive" should read --drive-- |
| 9 (Claim 22, | 7 line 2) | "particular" should read --particulate-- |
| 9 (Claim 22, | 11 line 6) | before "plate member" insert --a-- |
| 9 (Claim 26, | 46 line 4) | "form" should read --from-- |
| 10 (Claim 30, | 10 line 7) | "driving connected" should read --drivingly connected-- |

UNITED STATES PATENT AND TRADEMARK OFFICE

CERTIFICATE OF CORRECTION

PATENT NO. : Re. 36,486
DATED : January 11, 2000
INVENTOR(S) : J.H. Hughes

It is certified that error appears in the above-identified patent and that said Letters Patent is hereby corrected as shown below:

| COLUMN | LINE | |
|---|---|---|
| 10 (Claim 34, | 30 line 2) | "part from" should read --apart from-- |

Signed and Sealed this

Twenty-ninth Day of May, 2001

*Attest:*

Nicholas P. Godici

NICHOLAS P. GODICI

*Attesting Officer*

*Acting Director of the United States Patent and Trademark Office*